United States Patent [19]
Kim

[11] Patent Number: 5,734,757
[45] Date of Patent: Mar. 31, 1998

[54] POST-PROCESSING METHOD AND APPARATUS FOR USE IN AN IMAGE SIGNAL DECODING SYSTEM

[75] Inventor: Sang-Ho Kim, Seoul, Rep. of Korea

[73] Assignee: Daewoo Electronics, Co., Ltd., Seoul, Rep. of Korea

[21] Appl. No.: 639,418

[22] Filed: Apr. 29, 1996

[30] Foreign Application Priority Data

Apr. 29, 1995 [KR] Rep. of Korea ............ 95-10440

[51] Int. Cl.⁶ .................. G06T 5/00; G06K 9/40; G06K 9/44; H04N 1/409; H04N 5/21
[52] U.S. Cl. ............... 382/261; 382/268; 348/607; 348/625; 358/463
[58] Field of Search ............... 382/268, 261, 382/266, 264, 260, 250, 269; 358/433, 463; 348/607, 625, 420

[56] References Cited

U.S. PATENT DOCUMENTS

| | | | |
|---|---|---|---|
| 4,953,114 | 8/1990 | Sato | 382/264 |
| 5,384,849 | 1/1995 | Jeong | 382/268 |
| 5,454,051 | 9/1995 | Smith | 382/268 |
| 5,555,029 | 9/1996 | Kim | 382/268 |

*Primary Examiner*—Scott A. Rogers
*Attorney, Agent, or Firm*—Pennie & Edmonds LLP

[57] ABSTRACT

A post-processing filtering apparatus for use in an image signal decoding system, capable of improving the image quality of the system, comprises: memory means for storing the decoded image data of the current frame; a buffer for storing a target pixel data; means for filtering target pixel data to provide filtered target pixel data; means for adding a predetermined threshold to the target pixel data, thereby providing an upper value; first comparison means for comparing the filtered target pixel data with the upper value to provide a first selection signal; first selection means for selecting, in response to the first selection signal, the target pixel data stored at the buffer or the filtered target pixel data; means for subtracting the predetermined threshold from the target pixel data, thereby providing a lower value; second comparison means for comparing either the filtered target pixel data or the target pixel data selected at the first selection means, with the lower value to provide a second selection signal; second selection means for selecting, in response to the second selection signal, the target pixel data, or either the filtered target pixel data or the target pixel data selected at the first selection means, to thereby provide a filtered result; and means for updating the target pixel data stored at the memory means with the filtered result.

7 Claims, 4 Drawing Sheets

POST-PROCESSING METHOD AND APPARATUS FOR USE IN AN IMAGE SIGNAL DECODING SYSTEM

FIELD OF THE INVENTION

The present invention relates to a post-processing method for use in an image signal decoding system; and, more particularly, to an improved method capable of removing a blocking effect present at the boundary of a block of decoded image data by effectively post-processing the decoded image data, thereby improving the image quality of the system.

DESCRIPTION OF THE PRIOR ART

In various electronic/electrical applications such as high definition television and video telephone systems, an image signal may need be transmitted in a digitized form. When the image signal is expressed in the digitized form, there is bound to occur a large amount of digital data. Since, however, the available frequency bandwidth of a conventional transmission channel is limited, in order to transmit the image signal therethrough, the use of an image encoding system often becomes necessary to compress the large amount of digital data. Among various video compression techniques, the so-called hybrid coding technique, which combines temporal and spatial compression techniques together with a statistical coding technique, is known to be most effective.

Most hybrid coding techniques employ an adaptive inter/intra mode coding, orthogonal transform, quantization of transform coefficients, RLC(run-length coding), and VLC (variable length coding). The adaptive inter/intra mode coding is a process of selecting a video signal for a subsequent orthogonal transform from either PCM(pulse code modulation) data of a current frame or DPCM(differential pulse code modulation) data adaptively, e.g., based on a variance thereof. The inter-mode coding, also known as the predictive method, which is based on the concept of reducing the redundancies between neighboring frames, is a process of determining the movement of an object between a current frame and its one or two neighboring frames, and predicting the current frame according to the motion flow of the object to produce an error signal representing the difference between the current frame and its prediction. This coding method is described, for example, in Staffan Ericsson, "Fixed and Adapted Predictors for Hybrid Predictive/Transform Coding", *IEEE Transactions on Communications*, COM-33, No. 12, pp. 1291–1301 (December 1985); and in Ninomiya and Ohtsuka, "A Motion-compensated Interframe Coding Scheme for Television Pictures", *IEEE Transaction on Communications*, COM-30, No. 1, pp. 201–210 (January 1982), both of which are incorporated herein by reference.

The orthogonal transform, which exploits the spatial correlationships between image data such as PCM data of the current frame or motion compensated DPCM data and reduces or removes spatial redundancies therebetween, converts a block of digital image data into a set of transform coefficients. This technique is described in Chen and Pratt, "Scene Adaptive Coder", *IEEE Transactions on Communications*, COM-32, No. 3, pp. 225–232 (March 1984). By processing such transform coefficient data with quantization, zigzag scanning, RLC, and VLC, the amount of data to be transmitted can be effectively compressed.

Encoded image data is transmitted through a conventional transmission channel to an image signal decoder included in an image signal decoding system, which performs an inverse process of the encoding operation to thereby reconstruct the original image data. The reconstructed image data normally exhibits annoying artifacts such as a blocking effect wherein the border line of a block becomes visible at the receiving end. Such a blocking effect occurs since a frame is encoded in units of blocks.

As is well known in the art, to improve the quality of the reconstructed image data or decoded image data, generally, the decoded image data is further processed by employing a post-processing filter. The prior art post-processing filter performs filtering of the decoded image data with a predetermined cutoff frequency to thereby enhance the quality of the decoded image data.

Since, however, the conventional post-processing is performed without due regard paid to individual filtered pixel data, such filtering may not substantially reduce the blocking effect at the boundary of a block or may generate distorted image data, thereby deteriorating the image quality.

SUMMARY OF THE INVENTION

It is, therefore, a primary object of the invention to provide a post-processing method for use in an image signal decoding system capable of substantially reducing or eliminating the blocking effect present at the boundary of a block of decoded image data by effectively post-processing the decoded image data, thereby improving the image quality of the system.

In accordance with the invention, there is provided a filtering apparatus, for use in an image signal decoding system, for post-processing, on a pixel-by-pixel basis, decoded image data of a current frame from an image signal decoder included in the image signal decoding system, the filtering apparatus comprises:

memory for storing the decoded image data of the current frame;

a buffer for storing target pixel data which represents a pixel value of a pixel to be filtered and is included in the decoded image data of the current frame;

filter for filtering the target pixel data stored in the memory to provide filtered target pixel data;

adder for adding a predetermined threshold to the target pixel data stored at the buffer, thereby providing an upper value;

first comparator for comparing the filtered target pixel data and the upper value to provide a first selection signal;

first switch for selecting, in response to the first selection signal, the target pixel data stored at the buffer in case the filtered target pixel data is larger than the upper value; or selecting, in response to the first selection signal, the filtered target pixel data in case the filtered target pixel data is not larger than the upper value;

subtractor for subtracting the predetermined threshold from the target pixel data stored at the buffer, thereby providing a lower value;

second comparator for comparing either the filtered target pixel data or the target pixel data which is selected at the first switch, and the lower value to provide a second selection signal;

second switch for selecting, in response to the second selection signal, the target pixel data stored at the buffer in case either the filtered target pixel data or the target pixel data which is selected at the first switch is smaller than the lower value; or selecting, in response to the second selection signal, either the filtered target pixel data or the target pixel data which is selected at the first switch in case either the filtered target pixel data or the target pixel data which is selected at the first switch is not smaller than the lower value, to thereby provide a filtered result for the target pixel; and controller for updating the target pixel data stored at the memory with the filtered result for the target pixel.

BRIEF DESCRIPTION OF THE DRAWINGS

The above and other objects and features of the present invention will become apparent from the following description of preferred embodiments taken in conjunction with the accompanying drawings, in which.

DETAILED DESCRIPTION OF THE PREFERRED EMBODIMENTS

Figure 1:
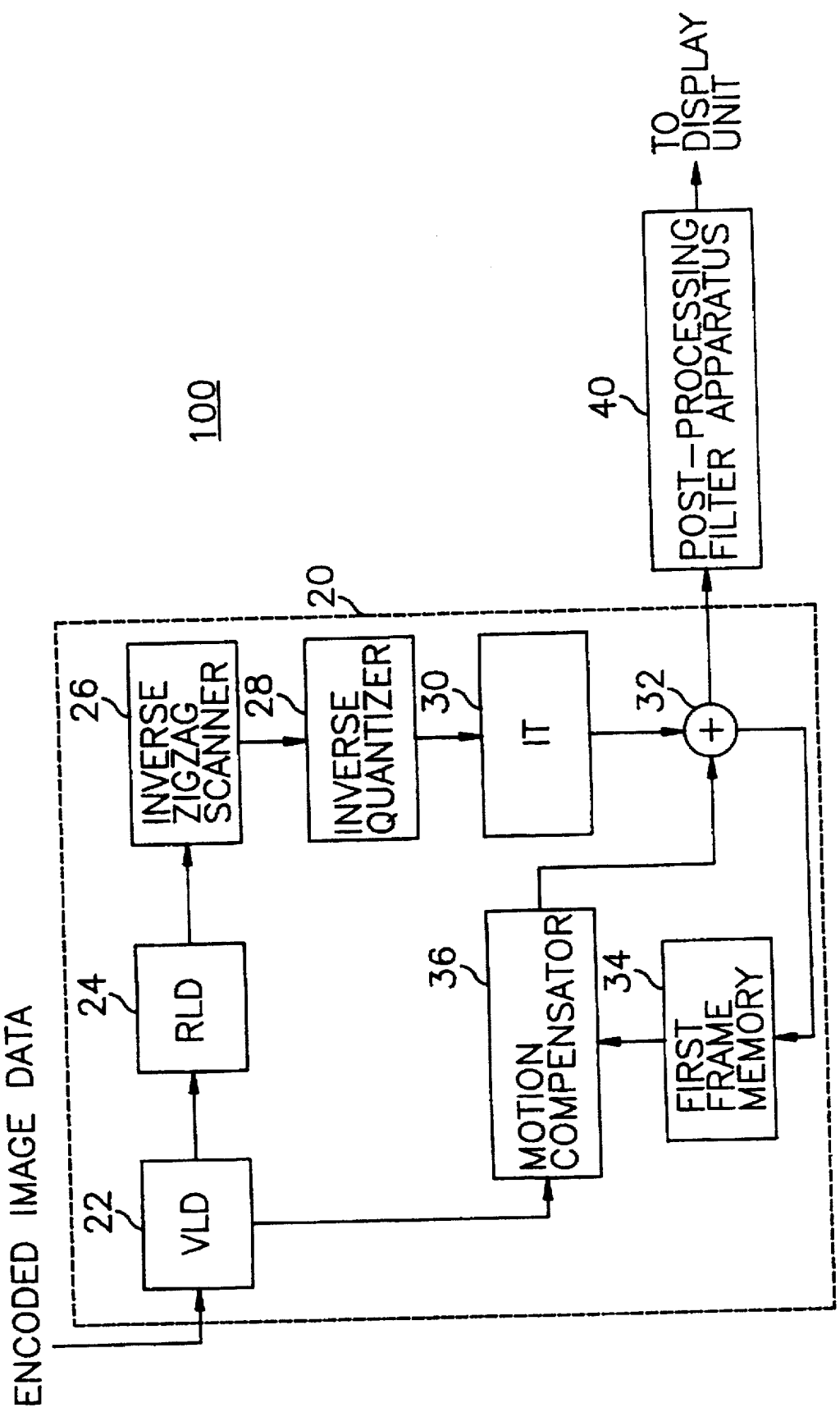
FIG. 1 shows a block diagram of an image signal decoding system.

Referring to FIG. 1, there is shown an image signal decoding system 100 for explaining a post-processing method and apparatus of the present invention. The image signal decoding system 100 comprises an image signal decoder 20 and a post-processing filter apparatus 40, wherein the image signal decoder 20 has a variable length decoder(VLD) 22, a run-length decoder(RLD) 24, an inverse zigzag scanner 26, an inverse quantizer 28, an inverse transformer(IT) 30, an adder 32, a first frame memory 34 and a motion compensator 36.

In the image signal decoder 20, encoded image data, i.e., a set of variable length coded transform coefficients and motion vectors is provided to the VLD 22 on a block-by-block basis. The VLD 22 serves to decode the set of variable length coded transform coefficients and the motion vectors to provide run-length coded transform coefficients to the RLD 24 and the motion vectors to the motion compensator 36, respectively. The VLD 22 is basically a look-up table; that is, in the VLD 22, a plurality of code sets is provided to define respective relationships between variable length codes and their run-length codes or motion vectors. Thereafter, the run-length coded transform coefficients are applied to the RLD 24, which is also a look-up table, for generating zigzag scanned transform coefficients. The zigzag scanned transform coefficients are then provided to the inverse zigzag scanner 26.

At the inverse zigzag scanner 26, the zigzag scanned transform coefficients are reconstructed to provide blocks of quantized transform coefficients to the inverse quantizer 28, wherein each block of quantized transform coefficients is converted into a set of transform coefficients. Subsequently, the set of transform coefficients is fed to the IT 30, e.g., an inverse discreet cosine transformer, which transforms the set of transform coefficients into a set of difference data between a block of a current frame and its corresponding block of a previous frame. The set of difference data is then sent to the adder 32.

In the meanwhile, the motion compensator 36 extracts a set of corresponding pixel data from the previous frame stored in the first frame memory 34 based on a motion vector, which corresponds to each block of the current frame from the VLD 22, and provides the set of extracted pixel data to the adder 32. The set of extracted pixel data from the motion compensator 36 and the set of pixel difference data from the IT 30 are then summed up at the adder 32 to thereby form reconstructed image data of a given block of the current frame. The reconstructed image data or decoded image data of the block is then applied to the first frame memory 34 for the storage thereof and to the post-processing filter apparatus 40.

At the post-processing filter apparatus 40 of the present invention, post-processing of the decoded image data from the adder 32 is carried out to effectively filter the decoded image data. The post-processed image data is then transmitted to a display unit(not shown).

Figure 2:
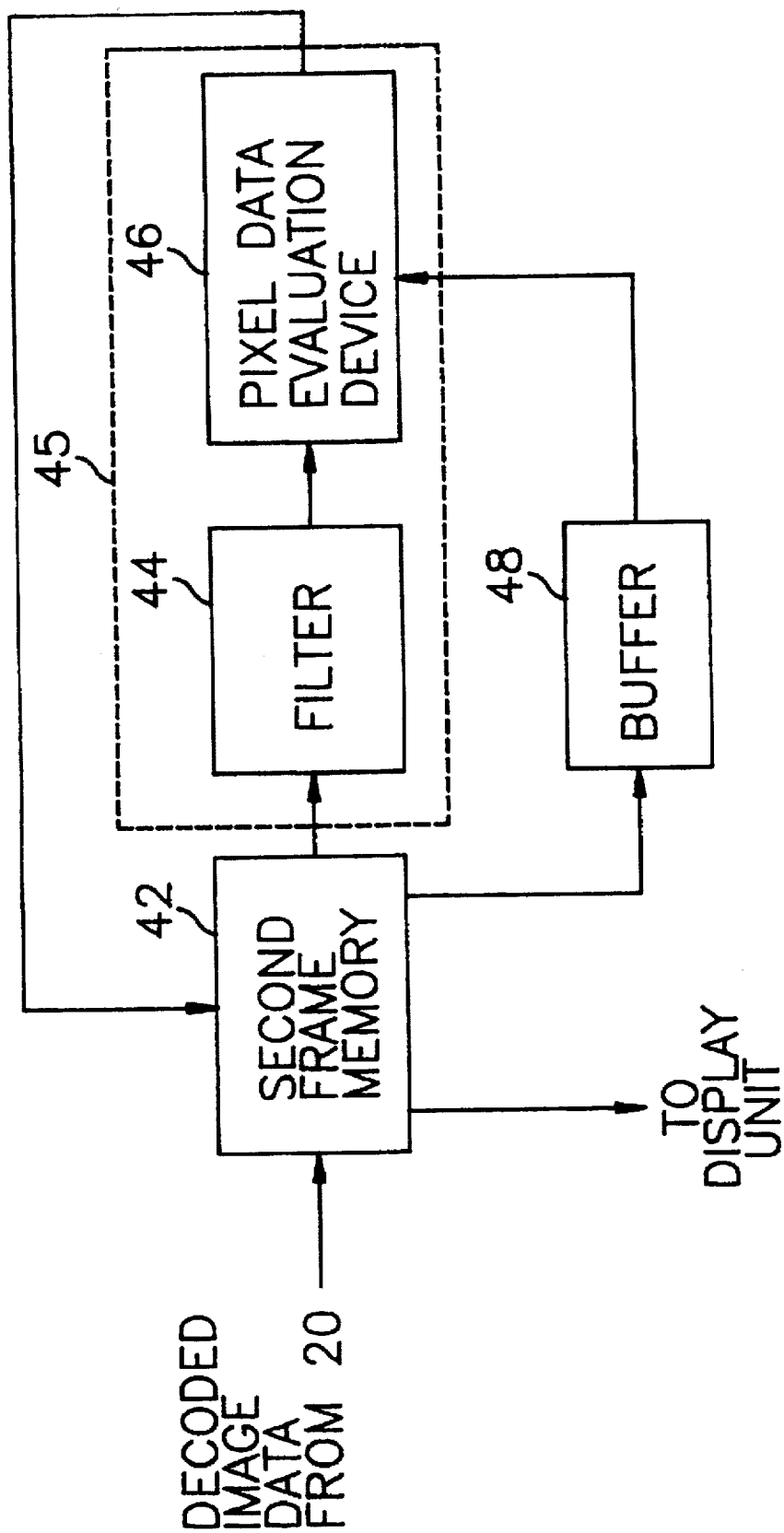
FIG. 2 represents a detailed block diagram of the post-processing filter apparatus shown in FIG. 1 in accordance with a preferred embodiment of the present invention.

Turning now to FIG. 2, there is illustrated a detailed block diagram of the post-processing filter apparatus 40 shown in FIG. 1 in accordance with a first embodiment of the present invention.

The post-processing filter apparatus 40, which has a second frame memory 42, a filtering block 45 and a buffer 48, filters the decoded image data of the current frame from the image signal decoder 20 by processing the current frame on a pixel-by-pixel basis.

The decoded image data of the current frame from the image signal decoder 20 is first stored in the second frame memory 42. In response to a control signal from a system controller (not shown), a target pixel data, i.e., a pixel value of a target pixel, is retrieved from the second frame memory 42 and provided to the buffer 48; and pixel data for N×N, e.g., 3×3, pixels including the target pixel and its neighboring pixels are fed to a filter 44 included in the filtering block 45, wherein the target pixel denotes a pixel to be filtered in the current frame and is located at the center of the N×N pixels with N being a positive integer.

The filtering block 45 serves to provide a filtered result for the target pixel in accordance with the present invention. Specifically, the filter 44, which receives the N×N pixel data from the second frame memory 42, performs the filtering thereof, e.g., with a predetermined cutoff frequency, to thereby generate filtered target pixel data. The filter 44 can be implemented by using such a conventional low pass filter as a Median filter or a Laplacian filter well known in the art. It should be noted that the predetermined cutoff frequency of the filter 44 or filter characteristics can be determined based on the required image quality of the image decoding system.

Thereafter, the filtered target pixel data from the filter 44 is supplied to a pixel data evaluation device 46, wherein either the filtered target pixel data or the original target pixel data is selected based on the absolute value of the difference between them, to thereby provide the filtered result for the target pixel back to the second frame memory 42. The filtering process is repeated for all the pixels in the current frame, and then, a filtered current frame stored at the second frame memory 42 is provided to the display unit for the display thereon.

Figure 3:
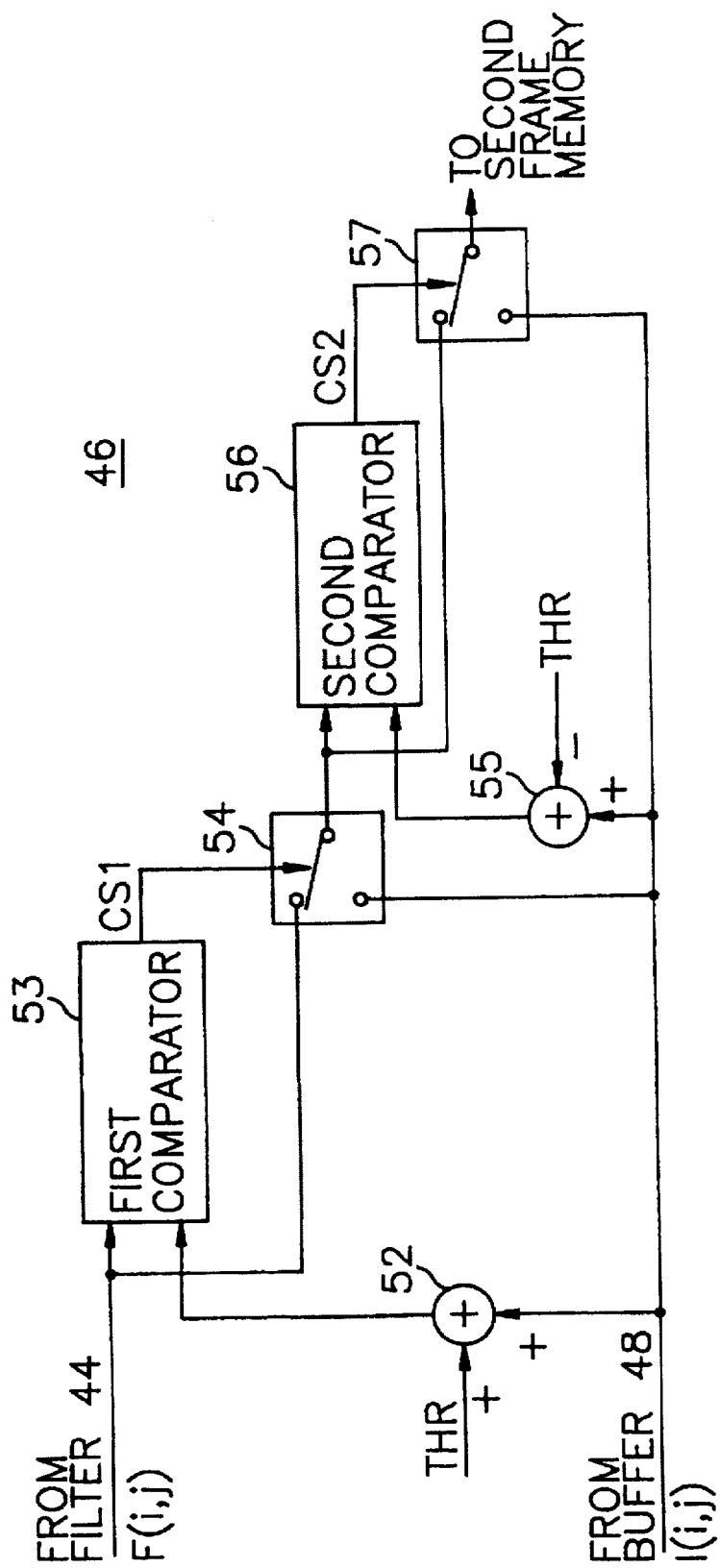
FIG. 3 illustrates a detailed block diagram of the pixel data evaluation device shown in FIG. 2.

Referring to FIG. 3, there is provided a detailed block diagram of the pixel data evaluation device 46. To summarize the function of the pixel data evaluation device 46, in case the absolute value of the difference between the original target pixel data and the filtered target pixel data is larger than a predetermined threshold value, e.g., THR, the original target pixel data is determined as the filtered result for the target pixel; and in case the absolute value of the difference is not larger than the predetermined threshold value, filtered target pixel data is determined as the filtered result for the target pixel.

The pixel data evaluation device 46 contains two comparators 53, 56, two switches 54, 57, an adder 52 and a subtractor 55. For the simplicity, the filtered target pixel data will be denoted as F(i,j); and the original target pixel data will be denoted as I(i,j). F(i,j) from the filter 44 is inputted to the first comparator 53 and the first switch 54. I(i,j) from the buffer 48 is coupled to the adder 52, the subtractor 55, and the first switch 54 and the second switch 57.

First, the predetermined threshold value THR is added to I(i,j) at the adder 52 and an upper value, i.e., I(i,j)+THR, is fed to the first comparator 53. At the first comparator 53, F(i,j) is compared with the upper value I(i,j)+THR, to thereby provide a first selection signal CS1 to the first switch 54. It should be appreciated that the predetermined threshold value THR can be determined based on the required image quality of the image signal decoding system.

At the first switch 54, the first selection signal CS1 serves to determine which of the two inputs thereto, i.e., F(i,j) and I(i,j), is selected and fed to the second comparator 56. That is, if F(i,j) is larger than the upper value I(i,j)+THR, I(i,j) is selected and fed to the second comparator 56; and otherwise, F(i,j) is selected and fed to the second comparator 56.

At the subtractor 55, THR is subtracted from I(i,j) to provide a lower value, i.e., I(i,j)−THR, to the second comparator 56. At the second comparator 56, the lower value I(i,j)−THR is compared with either of the I(i,j) or F(i,j) which is selected at the first switch 54, to thereby provide a second selection signal CS2 to the second switch 57.

At the second switch 57, the second selection signal CS2 serves to determine which of the two inputs thereto, i.e., either F(i,j) or I(i,j) which is selected at the first switch 54, and I(i,j). In case I(i,j) is selected at the first switch 54, the two inputs to the second switch 57 are both I(i,j) and, therefore, I(i,j) is provided from the second switch 57 as the filtered result for the target pixel. In case F(i,j) is selected at the first switch 54 and F(i,j) is larger than or equal to the lower value I(i,j)−THR, F(i,j) is selected as the filtered result for the target pixel at the second switch 57; in case F(i,j) is selected at the first switch 54 and F(i,j) is smaller than I(i,j)−THR, I(i,j) is selected as the filtered result for the target pixel data at the second switch 57. The filtered result for the target pixel is then coupled to the second frame memory 42 for updating the target pixel data stored therein with the filtered result for the target pixel.

The filtering operation for the target pixel may be repeated by providing N×N pixel data including the updated target pixel data from the second frame memory 42 to the filter 44 shown in FIG. 2 and performing the filtering process again. During the repeated filtering operation for the target pixel, the original target pixel data stored in the buffer 48 is not updated and used in determining the filtered result as described above. The filtering block may be implemented so that the characteristics or the cutoff frequencies of the filter and the predetermined threshold value THR for each repetition of filtering operation are different from each other.

The filtering operation for the target pixel may be repeated to a predetermined number. Alternatively, the filtered result for the target pixel right before the absolute value of the difference between F(i,j) and I(i,j) becomes larger than THR, is determined as the final filtered result for the target pixel. That is, when the absolute value of the difference between F(i,j) and I(i,j) becomes larger than THR, the filtering process stops and the target pixel data stored at the second frame memory 42 is no longer updated.

After the filtering operation for one target pixel is completed, the filtering operation is repeated for a next target pixel until all the pixel data of the current frame stored at the second frame memory 42 is updated.

Figure 4:
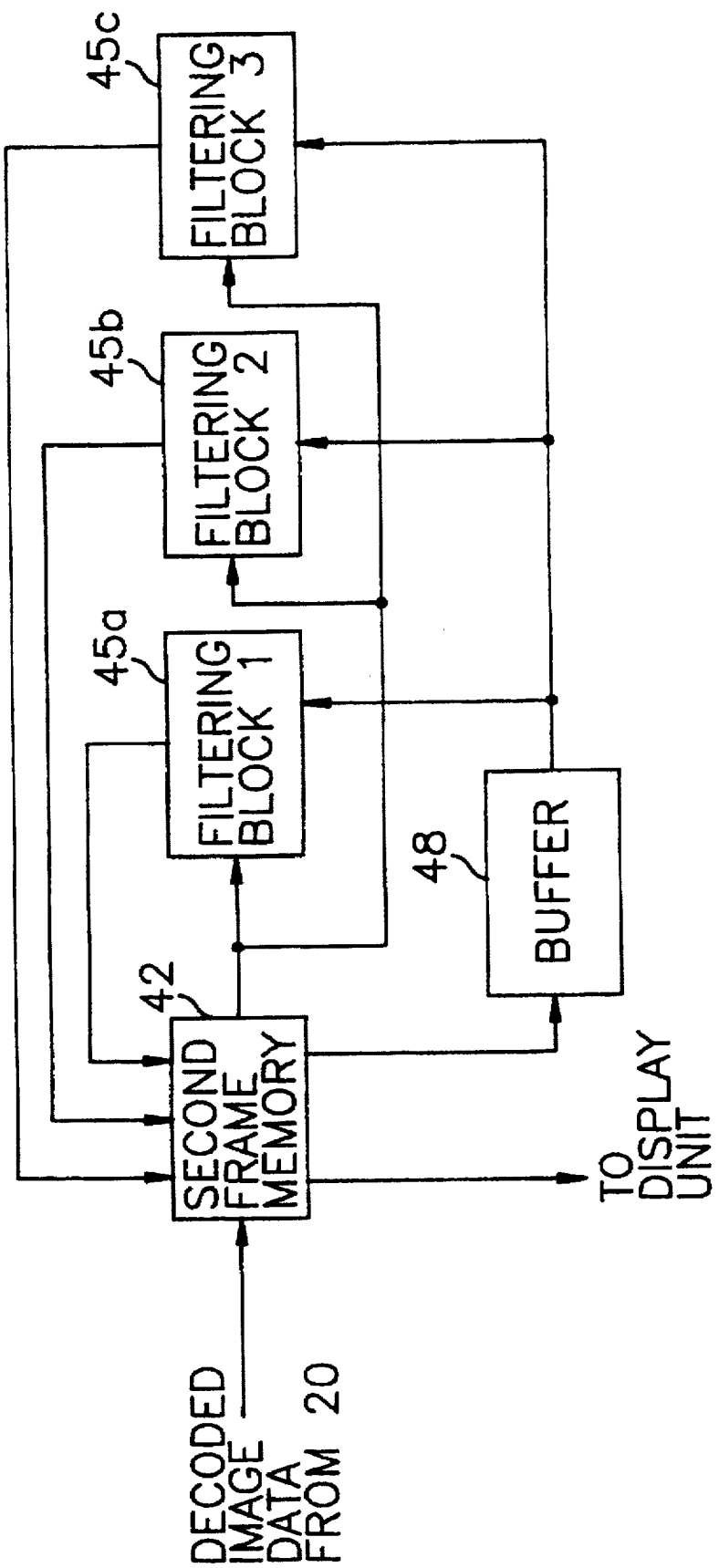
FIG. 4 provides a detailed block diagram of the post-processing filter apparatus shown in FIG. 1 in accordance with another preferred embodiment of the present invention.

Turning now to FIG. 4, there is illustrated a detailed block diagram of the post-processing filter apparatus 40 shown in FIG. 1 in accordance with a second preferred embodiment of the present invention.

The post-processing filter apparatus 40, which comprises a second frame memory 42, a buffer 48 and three filtering blocks 45a, 45b and 45c, filters the decoded image data of the current frame provided from the image signal decoder 20 shown in FIG. 1 by processing the current frame on a pixel-by-pixel basis. The function of the post-processing filter apparatus 40 is almost identical to that of the first embodiment shown in FIG. 2, except that the filtering process is performed at the three filtering blocks 45a to 45c. The filtering blocks are implemented so that the characteristics or the cutoff frequencies of the filters included in the filtering blocks and the predetermined threshold value THR of each filtering block are different from each other.

The decoded image data of the current frame from the image signal decoder 20 is first stored in the second frame memory 42. In response to a control signal from a system controller (not shown), target pixel data, i.e., a pixel value of a target pixel is retrieved and provided to the buffer 48, while pixel data for N×N, e.g., 3×3, pixels including the target pixel and its neighboring pixels are fed to the filtering block 1 45a. The operation of the filtering block 1 45a is identical to that of the filtering block 45 explained with reference to FIG. 2 and FIG. 3.

The filtered result for the target pixel from the filtering block 1 45a is fed back to the second frame memory 42 for updating the target pixel data stored therein with the filtered result for the target pixel data from the filtering block 1 45a.

Then, in response to a control signal from the system controller, pixel data for N×N pixels including the updated target pixel and its neighboring pixels are fed to the filtering block 2 45b. The filtering operation at the filtering block 2 45b is performed by using the filtered result for the target pixel from the filtering block 1 45a and the pixel data for the neighboring pixels. Other than that, the filtering operation is identical to that of the filtering block 1 45a.

The filtered result for the target pixel from the filtering block 2 45b is fed back to the second frame memory 42 and is coupled to the filtering block 3 45c together with pixel data for the neighboring pixels. After similar filtering operation at the filtering block 3 45c, the filtered result from the filtering block 3 45c is fed back to the second frame memory 42 for updating the target pixel data stored therein. The filtering process is repeated for all the pixels in the current frame, then, the filtered current frame stored at the second frame memory 42 is provided to the display unit.

Although the post-processing filter apparatus 40 including the three filtering blocks is illustrated, it can be easily known that any number of filtering blocks may be included therein.

Further, the operation of the filtering blocks can be modified in a similar way described with reference to FIG. 2. That is, instead of performing the filtering process for a predetermined number of times, e.g., 3, the filtered result for the target pixel right before absolute value of the difference between F(i,j) and I(i,j) becomes larger than THR, may be determined as the final filtered result for target pixel. For example, when the absolute value of the difference between F(i,j) and I(i,j) becomes larger than THR at the filtering block 2, the filtering process stops and the filtered result from the filtering block 1 45a is determined as a final filtered result for the target pixel.

The present invention is capable of substantially reducing or eliminating a blocking effect present at the boundary of a block of decoded image data by effectively performing post-processing filtering operation, thereby improving the image quality.

While the present invention has been shown and described with reference to the particular embodiments, it will be apparent to those skilled in the art that many changes and modifications may be made without departing from the spirit and scope of the invention as defined in the appended claims.

What is claimed is:

1. A filtering apparatus, for use in an image signal decoding system, for post-processing, on a pixel-by-pixel basis, decoded image data of a current frame from an image signal decoder included in the image signal decoding system, said filtering apparatus comprises:

memory means for storing the decoded image data of the current frame;

a buffer for storing target pixel data which represents a pixel value of a pixel to be filtered and is included in the decoded image data of the current frame;

means for filtering the target pixel data stored in the memory to provide filtered target pixel data;

means for adding a predetermined threshold to the target pixel data stored at the buffer, thereby providing an upper value;

first comparison means for comparing the filtered target pixel data with the upper value to provide a first selection signal;

first selection means for selecting, in response to the first selection signal, the target pixel data stored at the buffer in case the filtered target pixel data is larger than the upper value; or selecting, in response to the first selection signal, the filtered target pixel data in case the filtered target pixel data is not larger than the upper value;

means for subtracting the predetermined threshold from the target pixel data stored at the buffer, thereby providing a lower value;

second comparison means for comparing either the filtered target pixel data or the target pixel data which is selected at the first selection means, with the lower value to provide a second selection signal;

second selection means for selecting, in response to the second selection signal, the target pixel data stored at the buffer in case either the filtered target pixel data or the target pixel data which is selected at the first selection means is smaller than the lower value; or selecting, in response to the second selection signal, either the filtered target pixel data or the target pixel data which is selected at the first selection means in case either the filtered target pixel data or the target pixel data which is selected at the first selection means is not smaller than the lower value, to thereby provide a filtered result for the target pixel; and means for updating the target pixel data stored at the memory means with the filtered result for the target pixel.

2. The apparatus of claim 1 wherein the means for filtering includes:

means for providing the target pixel data and pixel data for neighboring pixels of the target pixel stored at the memory means; and filtering means for determining the filtered target pixel data based on the target pixel data and the pixel data for the neighboring pixels.

3. The apparatus of claim 2 wherein said filtering means determines the filtered target pixel data by using a median filter.

4. A method, for use in an image signal decoding system, for post-processing, on a pixel-by-pixel basis, decoded image data of a current frame from an image signal decoder included in the image signal decoding system, comprises the steps of:

(a) storing the decoded image data of the current frame;

(b) storing a target pixel data which represents a pixel value of a pixel to be filtered and is included in the decoded image data of the current frame;

(c) filtering the target pixel data stored at step (a) to provide filtered target pixel data;

(d) adding a predetermined threshold to the target pixel data stored at step (b), thereby providing an upper value;

(e) comparing the filtered target pixel data with the upper value to provide a first selection signal;

(f) selecting, in response to the first selection signal, the target pixel data stored at step (b) in case the filtered target pixel data is larger than the upper value; or selecting, in response to the first selection signal, the filtered target pixel data in case the filtered target pixel data is not larger than the upper value;

(g) subtracting the predetermined threshold from the target pixel data stored at step (b), thereby providing a lower value;

(h) comparing either the filtered target pixel data or the target pixel data which is selected at step (f) with the lower value, to thereby provide a second selection signal;

(i) selecting, in response to the second selection signal, the target pixel data stored at step (b) in case either the filtered target pixel data or the target pixel data which is selected at step (f) is smaller than the lower value; or selecting, in response to the second selection signal, either the filtered target pixel data or the target pixel data which is selected at step (f) in case either the filtered target pixel data or the target pixel data which is selected at step (f) is not smaller than the lower value, to thereby provide a filtered result for the target pixel;

(j) updating the target pixel data stored at step (a) with the filtered result for the target pixel;

(k) repeating said steps (b) to (j) N times; and (l) repeating said steps (b) to (k) for a next target pixel until all the pixels in the current frame are post-processed.

5. The method of claim 4 wherein said step (c) includes:

(c1) providing the target pixel data and pixel data for neighboring pixels of the target pixel stored at step (a); and (c2) determining the filtered target pixel data based on the target pixel data and the pixel data for the neighboring pixels.

6. A method, for use in an image signal decoding system, for post-processing, on a pixel-by-pixel basis, decoded image data of a current frame from an image signal decoder included in the image signal decoding system, comprises the steps of:

(a) storing the decoded image data of the current frame;

(b) storing a target pixel data which represents a pixel value of a pixel to be filtered and is included in the decoded image data of the current frame;

(c) filtering target pixel data stored at step (a) to provide filtered target pixel data;

(d) adding a predetermined threshold to the target pixel data stored at step (b), thereby providing an upper value;

(e) comparing the filtered target pixel data and the upper value to provide a first selection signal;

(f) selecting, in response to the first selection signal, the target pixel data stored at step (b) in case the filtered target pixel data is larger than the upper value; or selecting, in response to the first selection signal, the filtered target pixel data in case the filtered target pixel data is not larger than the upper value;

(g) subtracting the predetermined threshold from the target pixel data stored at step (b), thereby providing a lower value;

(h) comparing either the filtered target pixel data or the target pixel data which is selected at step (f) with the lower value, to thereby provide a second selection signal;

(i) selecting, in response to the second selection signal, the target pixel data stored at step (b) in case either the filtered target pixel data or the target pixel data which is selected at step (f) is smaller than the lower value; or selecting, in response to the second selection signal, either the filtered target pixel data or the target pixel data which is selected at step (f) in case either the filtered target pixel data or the target pixel data which is selected at step (f) is not smaller than the lower value, to thereby provide a filtered result for the target pixel;

(j) updating the target pixel data stored at step (a) with the filtered result for the target pixel in case the filtered target pixel data is selected as the filtered result for the target pixel;

(k) repeating said steps (b) to (j) in case the filtered target pixel data is selected as the filtered result for the target pixel to a predetermined number of times; and (l) repeating said steps (b) to (k) for a next target pixel until all the pixels in the current frame are post-processed.

7. The method of claim 6 wherein said step (c) includes:

(c1) providing the target pixel data and pixel data for neighboring pixels of the target pixel stored at step (a); and (c2) determining the filtered target pixel data based on the target pixel data and the pixel data for the neighboring pixels.

\* \* \* \* \*